United States Patent [19]

Davis

[11] 4,062,572
[45] Dec. 13, 1977

[54] TRANSITION FITTINGS

[75] Inventor: George W. Davis, Warren, N.J.

[73] Assignee: Inner-Tite, a division of Yara Engineering Corporation, Springfield, N.J.

[21] Appl. No.: 718,878

[22] Filed: Aug. 30, 1976

[51] Int. Cl.² ............................................. F16L 9/14
[52] U.S. Cl. .................................... 285/55; 285/249; 285/250; 285/348; 285/382.7
[58] Field of Search ................... 285/15, 16, 322, 323, 285/348, 353, 55, 249, 250, 382.7

[56] References Cited

U.S. PATENT DOCUMENTS

| 2,339,771 | 1/1944 | Davies | 285/348 X |
|---|---|---|---|
| 3,083,041 | 3/1963 | Owenmark | 285/323 |
| 3,248,135 | 4/1966 | Meripol | 285/323 |
| 3,545,794 | 12/1970 | Wise | 285/248 |
| 3,563,575 | 2/1971 | Sanford | 205/323 |
| 3,591,208 | 7/1971 | Nicolaus | 285/348 X |
| 3,596,933 | 8/1971 | Luckenbill | 285/348 X |
| 3,814,466 | 6/1974 | Leopold | 285/348 |
| 3,989,283 | 11/1976 | Pepper | 285/323 |

FOREIGN PATENT DOCUMENTS

| 1,382,489 | 11/1964 | France | 285/323 |
|---|---|---|---|

Primary Examiner—Werner H. Schroeder
Assistant Examiner—Conrad L. Berman
Attorney, Agent, or Firm—Buell, Blenko & Ziesenheim

[57] ABSTRACT

A transition fitting for connecting plastic conduit to various elements of a fluid transfer system is provided which includes in combination a pressure deformable plastic conduit, rigid sleeve means inserted in one end of said plastic conduit in circumferential contact therewith, a pressure deformable rubbery resilient member extending around the conduit and sleeve in contact with said conduit, compression ring means extending around the conduit and sleeve having a radial face abutting one face of the resilient member and applying compressive pressure thereon, a radially expandable and contractible frusto-conical gripping member, said gripping member surrounding the conduit and sleeve and having a base portion engaging the other side of the compression ring, spaced surface engaging means on the gripper member in contact with the exterior of the conduit, a first body member surrounding the conduit and sleeve and confining the rubbery gasket against outward radial expansion, said body member and compression ring cooperating to reduce the axial thickness of the rubbery gasket to exert radial sealing pressure on the conduit, and a second body member surrounding the conduit and sleeve and having an internal frusto-conical surface mating with that of the gripping member, said first and second body members being axially movable relative to one another to reduce the distance between them to compress the rubbery gasket axially and radially inwardly and the gripping member radially inwardly against the conduit.

10 Claims, 4 Drawing Figures

TRANSITION FITTINGS

This invention relates to transition fittings and particularly to fittings for joining plastic tubing and pipe or the like.

The use of transition fittings for joining plastic tubing and metal pipe is old and well known as are the problems encountered in their use. Among the common problems are fatigue and failure of the plastic pipe at the connection because of the stress applied by the transition fittings on the plastic pipe, leaking at the fitting because of inability to seal the fitting under the pressure involved, pull-out of the plastic tubing from the fitting etc. Typical of the fittings proposed in the prior art are those shown in Engel U.S. Pat. No. 3,375,025, Wise U.S. Pat. No. 3,545,794, Luckenbill U.S. Pat. No. 3,596,933, Leopold U.S. Pat. No. 3,814,466, Okuniewski et al. U.S. Pat. No. 3,762,565, Burge U.S. Pat. No. 3,830,531, Christie U.S. Pat. No. 3,881,754, Marshall U.S. Pat. No. 3,158,388, Parker U.S. Pat. No. 2,300,464, Jennings U.S. Pat. No. 1,699,591, Keller U.S. Pat. No. 1,200,118, Patty U.S. Pat. No. 1,098,294, Sautter U.S. Pat. No. 923,081, French U.S. Pat. No. 715,566 and German Pat. No. 362,441. These prior patents show the struggle which has taken place in the industry in its attempts to solve these problems.

I have developed a transition fitting which solves these problems. The fitting of this invention has withstood pressures far in excess of those encountered in the gas industry distribution systems, or in the distribution systems used for residential or commercial water systems. The actual gasket pressure is, however, low and closely controlled so that no undue stress or pressure is imparted to the plastic tubes and pipes on which it is used. This eliminates the problem of fatigue and failure of plastic tubing at the connection, which has been an item of growing concern in this industry. Finally the fitting is designed to prevent torsional stresses being applied to the plastic tube or pipe during connection and uses a very low torque setting to reach the necessary gasket compression.

The present invention provides in combination a pressure deformable plastic conduit, rigid sleeve means inserted in one end of said plastic conduit in circumferential contact therewith, a pressure-deformable rubbery resilient member extending around the conduit and sleeve in contact therewith, compression ring means extending around the conduit and sleeve having a radial face abutting one face of the resilient member, a frusto-conical, a frusto-conical gripping member having alternate axial slots surrounding the conduit and sleeve with a base portion engaging the other side of said compression ring, said gripping member having a plurality of internal barbs engaging the external surface of the conduit, a first body member surrounding the conduit and sleeve and confining the rubbery gasket against outward radial expansion, said body member and compression ring cooperating to reduce the axial thickness of the rubbery gasket to exert radial sealing pressure on the conduit, and a second body member surrounding the conduit and sleeve and having an internal frusto-conical surfacing mating with that of the gripping member, said first and second body members being axially movable relative to one another to reduce the distance between them to compress the gasket and acting on the gripping member to compress it onto the conduit and to engage the internal barbs into the external circumference of the conduit. Preferably the compression ring has an axial flange adapted to enter into the first member to compress the rubbery gasket a predetermined controlled amount. The frusto-conical gripping member is preferably made of Nylon and is slit axially at regular intervals from alternate ends so as to be radially compressible.

In the foregoing general description I have set out certain objects, purposes and advantages of my invention. Other objects, purposes and advantages of this invention will be apparent from a consideration of the following description and the accompanying drawings in which.

Figure 1:
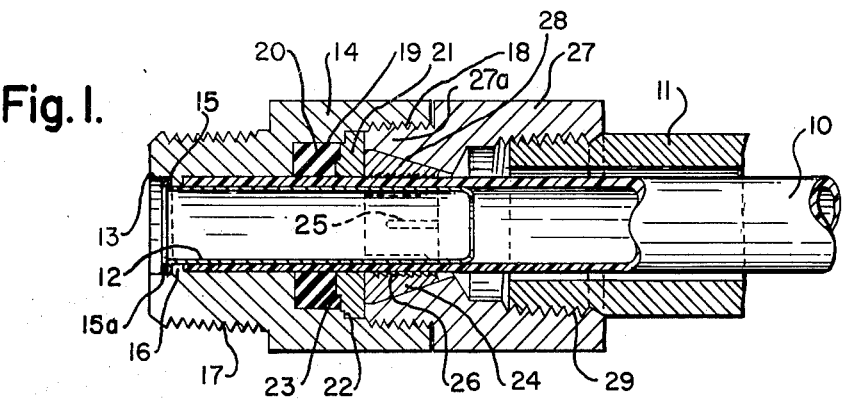
FIG. 1 is a cross section of a service head adapter transition fitting embodying my invention.

Referring to the drawings, I have illustrated in FIG. 1 a transition fitting for use in connecting a plastic tube or conduit liner 10 in an outer metal pipe 11 to another pipe coupling. A sleeve 12 is inserted into the free end of conduit 10 through opening 13 in body member 14. This sleeve 12 preferably has a small radial flange 15 at its free end which abuts annular stop 16 in opening 13 of body member 14 and is retained against the stop 16 by a lock ring 15a. The external diameter of sleeve 12 is approximately that of the inner diameter of the conduit so that the sleeve will slide into the end of the conduit. The sleeve is a strong, rigid, relatively thin, cylindrical element of steel, brass, aluminum, etc. Body member 14 has an external male thread 17 at the end through which sleeve 12 is inserted and an internal female thread 18 at the opposite end. Within the female threaded end 18 there is provided an annular well 19 which is of smaller diameter than the threaded female end 18. A rubbery resilient gasket 20 is inserted in well 19 and is of the same external diameter as the internal diameter of the well. A compression ring 21 fits with female end 18 and is provided with a first reduced portion 22 adapted to slidably fit in well 19 so as to confine gasket 20 and a second reduced portion 23 designed to provide the necessary compression of gasket 20 to provide a seal. A frusto-conical ferrule 24 having axial slits 25 and having barbs or knurls 26 on the inner periphery surrounds conduit 10 with its base end abutting compression ring 21. A second body portion 27 having a male threaded end 27a with a frusto-conical inner cavity 28 adapted to surround ferrule 24 surrounds conduit 10 and compresses ferrule 24 as it is threaded into the female portion 18 of body member 14 so that barbs 26 engage the exterior of conduit 10. The length of barbs 26 is adjusted so that they do not and cannot reduce the effective wall thickness below the minimum industry standard. Body member 27 is provided with a female thread opening 28 opposite male threaded end 27a to receive the end of pipe 11 being lined by conduit 10.

Figure 2:
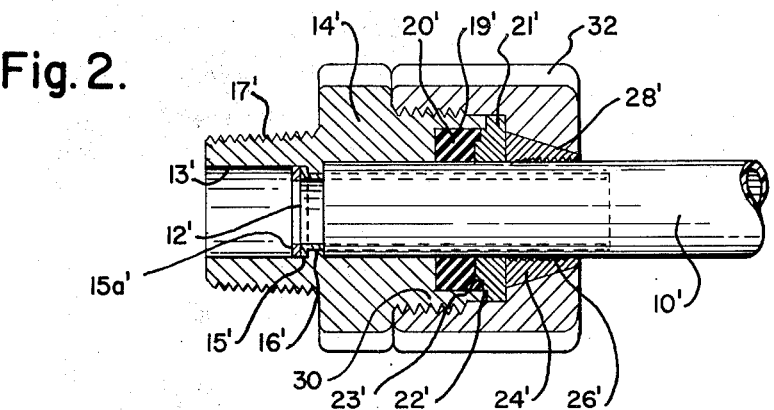
FIG. 2 is a cross section of a second embodiment of transition fitting embodying this invention.
Figure 3:
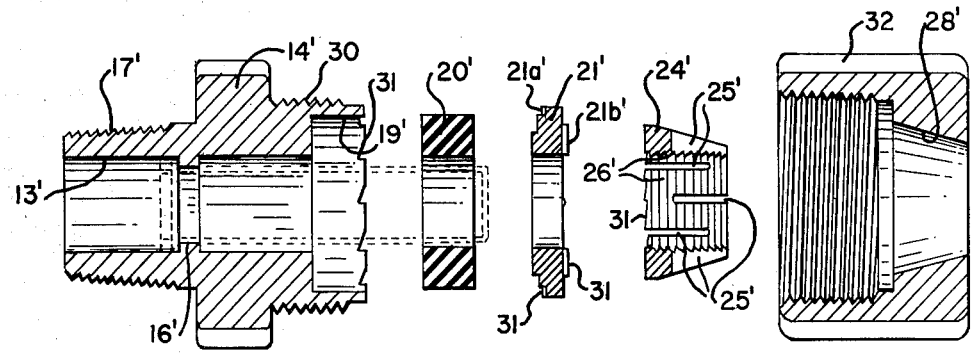
FIG. 3 is an exploded sectional view of the fitting of FIG. 2.

In FIGS. 2 and 3, I have illustrated another embodiment of my invention adapted for use in connecting a plastic conduit to a female threaded member, not shown. In this embodiment those parts which are the same as parts of FIG. 1 will be given like numbers with a prime suffix. This embodiment differs from that of FIG. 1 in that body member 14' has a first male threaded portion 17' exactly like FIG. 1 and a second male threaded portion 30 instead of female threaded end 18. In addition the mating surfaces 30, 21a' and 21b' and 24' of the body member 14', the compression ring 21' and ferrule 24' are provided with interfitting teeth 31 which prevent relative rotation of these parts during tightening of second body portion 32 which differs from that of FIG. 1 in not having a female portion for reception of a pipe to be lined.

Figure 4:
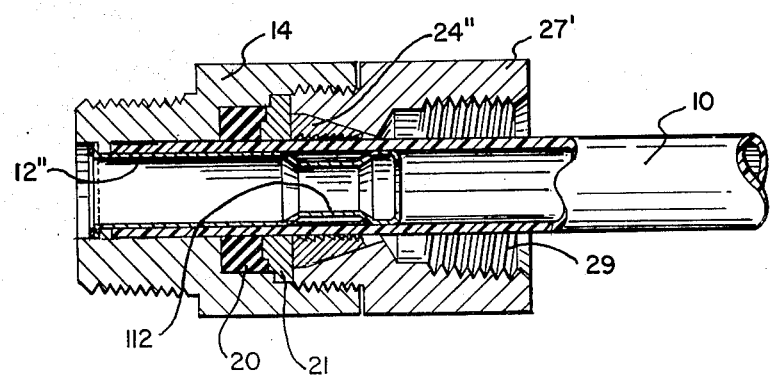
FIG. 4 is a cross section of a third embodiment of my invention.

In FIG. 4, I have illustrated a third embodiment of my invention which is identical to FIG. 1 except that the sleeve 12" is provided with a groove 112 beneath the ferrule 24" to provide additional gripping action.

In my invention the gripping ferrule 24, 24' and 24" is preferably made with an inside diameter slightly less than the outside diameter of the pipe so that when installed, little or no force need by applied by torquing of the second body part or nut 27, 27' to effect a grip against pull out. In addition, the adjustment of the projecting portion 23, 23' of the compression ring effectively sets the pressure of the gasket on sealing, so that there is a uniform, low and controlled gasket pressure. As a result of this design, the fitting of this invention can be usually assembled by hand without special tools and without the wide variance of torque which occurs between one installer to another.

In the foregoing specification I have set out certain preferred embodiments and practices of my invention, however, it will be understood that this invention may be otherwise embodied within the scope of the following claims.

I claim:

1. A transition fitting comprising in combination a pressure deformable plastic conduit, rigid sleeve means inserted in one end of said plastic conduit in circumferential contact therewith, a pressure deformable rubbery resilient member extending around the conduit and sleeve in contact with said conduit, compression ring means extending around the conduit and sleeve having a radial face abutting one face of the resilient member and applying compressive pressure thereon, a radially expandable and contractible frusto-conical non-resilient gripping member, said gripping member surrounding the conduit and sleeve and having a base portion engaging the other side of the compression ring, spaced surface engaging means on the gripper member in contact with the exterior of the conduit, a first body member surrounding the conduit and sleeve and forming with the compression ring means an annular well confining the rubbery gasket against outward radial expansion, said body member and compression ring cooperating to reduce the axial thickness of the rubbery gasket to exert a preselected radial sealing pressure on the conduit, and a second body member surrounding the conduit and sleeve and having an internal frusto-conical surface mating with that of the gripping member, said first and second body members being axially movable relative to one another to reduce the distance between them to compress the rubbery gasket axially and radially inwardly and the gripping member radially inwardly against the conduit.

2. A transition fitting as claimed in claim 1 wherein the compression ring has an axial compression portion engaging the rubber gasket and stop means acting on the first body member limiting the compression of the rubbery gasket by a preset amount.

3. A transition fitting as claimed in claim 2 wherein the axial compression portion and the stop means are formed by successive radial steps in the periphery of the compression member.

4. A transition fitting as claimed in claim 1 wherein the spaced surface engaging means on the gripping member are a plurality of spaced barbs extending angularly downwardly toward the first member and the conduit.

5. A transition fitting as claimed in claim 1 wherein the spaced surface engaging means is knurling on the inner surface of the gripping member.

6. A transition fitting as claimed in claim 1 wherein the first body member and the compression member have interfitting axially directed locking means preventing relative rotation.

7. A transition fitting as claimed in claim 1 wherein the compression member and the gripping member have interfitting axially directed locking means preventing relative rotation.

8. A transition fitting as claimed in claim 1 wherein the compression member has axially directed locking means on each side interfitting with locking means on the first body member on one side and the gripping member on the other whereby relative rotation of one with respect to the other is prevented.

9. A transition fitting as claimed in claim 1 wherein the internal diameter of the gripping member is normally smaller than the outer diameter of the conduit.

10. A transition fitting as claimed in claim 1 wherein the gripping member has alternate axial slots extending from opposite ends of the member whereby said member can be expanded radially.

* * * * *